(12) United States Patent
Kesselring et al.

(10) Patent No.: US 6,533,854 B2
(45) Date of Patent: Mar. 18, 2003

(54) PROCESS FOR PRODUCING A SHAPED BODY MADE OF BIODEGRADABLE MATERIAL

(75) Inventors: Anneliese Kesselring, Markt Taschendorf (DE); Norbert Kaiser, Markt Taschendorf (DE); Thomas Köblitz, Dietersheim (DE)

(73) Assignee: Apack AG für Biologische Verpackungen, Markt Erlbach (DE)

( * ) Notice: Subject to any disclaimer, the term of this patent is extended or adjusted under 35 U.S.C. 154(b) by 0 days.

(21) Appl. No.: 10/077,798

(22) Filed: Feb. 20, 2002

(65) Prior Publication Data

US 2002/0108532 A1 Aug. 15, 2002

Related U.S. Application Data

(63) Continuation of application No. PCT/EP99/08371, filed on Nov. 2, 1999.

(30) Foreign Application Priority Data

Dec. 24, 1998 (DE) .......................................... 198 60 360

(51) Int. Cl.$^7$ ................................................. C08L 3/02
(52) U.S. Cl. ................................................. 106/162.51
(58) Field of Search .................................... 106/162.51

(56) References Cited

U.S. PATENT DOCUMENTS

| 5,376,320 A | 12/1994 | Tiefenbacher et al. | ........ 264/50 |
| 5,679,145 A | 10/1997 | Andersen et al. | ........... 106/162 |

FOREIGN PATENT DOCUMENTS

| DE | 19706642 | 8/1998 |
| WO | WO95/15894 | 6/1995 |

*Primary Examiner*—David Brunsman

(57) ABSTRACT

The invention relates to a process for producing a shaped body made of biodegradable material in which a bakeable mass is produced by mixing from 7.8 to 8.5% by weight of cellulosic fibers, from 16.1 to 17.6% by weight of native starch, from 5.4 to 6.0% by weight of pregelatinized starch and from 68.0 to 70.6% by weight of water, in each case based on the bakeable mass, and the bakeable mass is then baked to form a shaped body. The invention also relates to shaped bodies obtainable by this process and to their use as packaging material.

13 Claims, No Drawings

PROCESS FOR PRODUCING A SHAPED BODY MADE OF BIODEGRADABLE MATERIAL

CROSS REFERENCE TO RELATED APPLICATIONS

This is a Continuation of International Application PCT/EP99/08371 filed Nov. 2, 1999, which was published in English in WO 00/39213 on Jul. 6, 2000, and which claims priority from German Application No. DE 198 60 360.6, filed Dec. 24, 1998, the priority of which is hereby claimed.

BACKGROUND OF THE INVENTION

1. Field of the Invention

The invention relates to a process for producing a shaped body made of biodegradable material, a shaped body which is obtainable by this process and its use for packaging articles, in particular food.

2. Description of the Related Art

Currently, the avoidance, reduction and disposal of waste is one of the greatest environmental problems. This is becoming especially apparent in the case of shaped bodies, such as beakers, plates, cups, dishes, cartons and other containers which are used, for example, for packaging foods and in fast-food restaurants. Thus foods, for example, especially those which are intended for immediate consumption, are frequently purchased in voluminous packaging. Although such shaped bodies are relatively light, after their use, they increase on their disposal the amount and volume of long-lasting solid wastes. As a result these shaped bodies, owing to their considerable volume, make demands on the refuse containers and the refuse landfills. In addition, they are readily blown away by the wind. If such shaped bodies are discarded in the open after the foods contained therein have been consumed, they frequently disfigure the landscape over years.

Many of the materials used to date for producing the above-mentioned shaped bodies are not produced from renewable raw materials, which in addition represents a heavy ecological burden. As becomes clear from the circumstances described above, there is a great requirement for a material which can be used for shaped bodies, in particular packaging, which is predominantly produced from renewable raw materials and which is very rapidly biodegradable.

DE 197 06 642 A discloses a shaped body made of biodegradable material consisting of cellulose fibres, native and/or modified starch and water which is prepared by subjecting a mixture (bakeable mass) of these constituents to a baking operation with formation of the shaped body. The content of fibrous materials in the mass is from 25 to 75% by weight, the starch content is from 13 to 38% by weight and the water content is from 13 to 38% by weight.

For baking, this bakeable mass is placed (metered) into a baking mold and baked therein by heating. The baking mold can be formed here by at least two baking sheets, i.e. an upper and lower baking sheet, which are held in a baking iron, the inner surfaces of the baking sheets being spaced apart in the closed locked state of the baking mold, forming a mold cavity.

However, this process has the disadvantage that the foaming, i.e. the expansion behavior during thermoforming, is not satisfactory.

SUMMARY OF THE INVENTION

The object thus underlying the present invention is to provide a process for producing a shaped body made of biodegradable material in which the bakeable mass used shows good expansion behavior during thermoforming.

According to the invention this is achieved by a process for producing a shaped body made of biodegradable material which is distinguished in that a bakeable mass is produced by mixing from 7.8 to 8.5% by weight of cellulosic fibres, from 16.1 to 17.6% by weight of native starch, from 5.4 to 6.0% by weight of pregelatinized starch and from 68.0 to 70.6% by weight of water, in each case based on the bakeable mass, and the bakeable mass is then baked, forming a shaped body.

Surprisingly it has been found that an improved expansion behavior during thermoforming is achieved owing to the high water content, as a result of which the shaped bodies obtained are not only very light, but also, the foam-like wall structure obtained by the production process has a heat-insulating action.

The term "bakeable mass" refers to masses of any type which can be baked, i.e. can be foamed by steam which escapes during the baking.

The starch which is present in the bakeable mass can be an amylopectinaceous starch, for example selected from natural starch, chemically and/or physically modified starch, biotechnologically produced and/or genetically modified starch and mixtures thereof. Examples of the starches which are usable in the process of the invention are potato starch, maize starch, rice starch, tapioca starch and wheat starch and other starches produced from plant materials.

In the process of the invention, cellulosic fibres are used, the term "cellulosic fibres" referring to fibres of any type which contain cellulose or consist of cellulose. Plant fibres preferred here are those of differing lengths in the range from 600 μm to 3000 μm, principally from wood, hemp or cotton. The width of the cellulosic fibres can be in the range from 10 μm to 60 μm.

The expression "fibres" used here refers to fine, thin objects restricted in their length, the length being greater than the width. They can be present as individual fibres or as fibre bundles. Such fibres can be produced in a manner known to those skilled in the art.

DETAILED DESCRIPTION OF THE PREFERRED EMBODIMENTS

In a preferred embodiment of the process according to the invention, the viscosity of the bakeable mass is set at a value in the range from 70,000 to 80,000 mPa.s. This can be achieved by varying the amounts of the constituents used in the process of the invention, in particular via the water content. The metering behavior of the bakeable mass is improved via this viscosity. As a result it is possible to meter the mass into the baking sheets in the form of a single large lump which, owing to its high water content, distributes itself spontaneously therein and completely fills all cavities. The reason for this is firstly the improved viscosity, but secondly also, because of the higher water content, a rapidly increasing pressure course due to the higher water evaporation which ensures that the bakeable mass is more rapidly distributed before the starch is completely baked and thus becomes solid.

As was mentioned above, in the process of the invention pregelatinized starch is used. The pregelatinized starch is preferably produced here from about 90 to 94% by weight of water and from 6 to 10% by weight of native starch, particularly preferably from about 92% by weight of water and about 8.0% by weight of native starch.

In the process, a homogeneous suspension is first produced from these two components. This can be performed, for example, by vigorously stirring water and the native starch in a conventional agitator. This homogeneous suspension is then heated and subsequently cooled.

The heating is preferably carried out to a temperature of from 68 to 70° C. It has further proved to be expedient to carry out the heating for a period of about 10 minutes, i.e. the suspension is kept at a constant temperature of 68 to 70° C. for a period of about 10 minutes.

The pregelatinized starch is subsequently cooled. The temperature to which it is cooled is preferably about 50° C.

In a preferred embodiment of the process according to the invention, the bakeable mass is prepared by combining in parallel or sequentially the cellulosic fibres, the native starch, the pregelatinized starch and the water and mixing them. This represents a considerable improvement in comparison to previously known processes for producing shaped bodies made of biodegradable material in which the components are mixed in one after the other, since this simplifies the entire mixing process.

In a further preferred embodiment of the process according to the invention, the pregelatinized starch is added to a mixture of native starch, fibres and water at a temperature of about 50° C., preferably exactly 50° C.

During mixing, the constituents cellulosic fibres, native starch, pregelatinized starch and water are mixed with one another homogeneously in the course of about 5 minutes. The mixing temperature is 40° C. After mixing the mixture is not subsequently cooled.

The bakeable mass used in the process of the invention can either consist only of the components water, fibres, native and pregelatinized starch, i.e. no other constituents are present, apart from those which are present in these components as usual accompanying materials, e.g. contaminants of the starch, or additional additives can be present, for example fillers such as chalk, kaolin, talcum, gypsum, aluminum, titanium dioxide or aluminum oxide, fluxes, such as magnesium carbonate, magnesium hydroxide carbonate, sodium hydroxide solution and ammonium hydroxide, and also coloring pigments and food colors.

The bakeable mass described in more detail above is then baked. For this purpose it is placed (metered) into a baking mold and heated at a temperature of from 100 to 200° C., in particular 150° C., in a closed baking mold for from 10 to 100 seconds, in particular 60 seconds. The baking mold here is constructed depending on the shape of the desired end product, for example in the form of a shell. The baking mold can be formed by at least two baking sheets, i.e. an upper and lower baking sheet, which are held in a baking iron, the inner surfaces of the baking sheets being spaced apart in a closed locked state of the baking mold, forming a mold cavity, and the mold cavity is filled by the bakeable mass. The baking mold has specially shaped evaporation holes for discharging the steam. For the simultaneous production of a multiplicity of shaped bodies, a multiplicity of balling irons can also be used. Such apparatuses for baking are based on the waffle baking technology which is known per se.

The metering of the bakeable mass into the baking mold can be performed by compressed air, screw conveyors, pumps or by applying a vacuum. In the course of this it is not necessary for mass to be injected into the individual molds, but it is sufficient to meter a product lump into the center of the baking mold.

During baking of the bakeable mass, the water present in this mass is removed, the mass being foamed by the removal of the water and the starch present in the mass being gelatinized.

A moisture-impermeable biodegradable film can be applied to the shaped bodies obtainable by this process. The film in this case can be applied in a deep-draw process, expediently, the film being stretched directly after the baking operation onto the still hot shaped body. Accordingly, the heat of baking is exploited in order to achieve a still better adhesion of the film.

In order to achieve a complete coverage of the shaped body with the film, it is possible to provide that the shaped body is coated from one side by deep-drawing and on the other side by hot-embossing.

Alternatively, it can also be provided that the film is stretched only on one side of the shaped body and the other side in each case is provided with a water-resistant coating by spraying with a cellulose solution, preferably cellulose acetate propionate or acrylate.

The film can consist of amylose or amylose derivatives, of polylactic acid or polylactic acid derivatives or of modified polylactic acid, with or without biodegradable additives.

The present invention likewise relates to a shaped body made of biodegradable material which is obtainable by the process of the invention.

This shaped body essentially has a starch-fibre composite which, as described above, is obtained by the process according to the invention and which can be described as a foam-like wall structure which, in particular, has a heat-insulating action.

This material can optimally be used as material for shaped bodies (i.e. bodies which have a defined shape) of any type, e.g. as disposable crockery, as fast-food packaging (for hamburgers and French fried potatoes), as packaging, for example, for foods such as dry, moist, pasty, deep-fried foods. After applying a biodegradable film to the material according to the invention this can then serve for holding liquid foods, such as hot drinks and soups.

The shaped body here can assume any desired shape, e.g. the shape of a dish, a plate, a beaker or a plate.

The example below illustrates the invention.

EXAMPLE
Carrying Out a Process of the Invention for Producing Bodies Made of Biodegradable Material The formulas specified in the table below, all quantities being specified in per cent by weight, were used for producing a bakeable mass.

|  | No. 1 | No. 2 | No. 3 |
| --- | --- | --- | --- |
| Fibres | 8.50% | 8.16% | 7.84% |
| Native starch | 17.56% | 16.82% | 16.17% |
| Pregelantinized starch | 5.94% | 5.70% | 5.48% |
| Water | 68.00% | 69.32% | 70.51% |
|  | 100.00% | 100.00% | 100.00% |

The pregelatinized starch consists of 91.97% of water and 8.03% of native starch. To produce the pregelatinized starch, a homogeneous suspension is produced from these components and this suspension is heated to a temperature of from 68° C. to 70° C. and held constant at this temperature over 10 minutes. The pregelatinized starch is then specifically cooled to 50° C. before, at a fixed temperature of exactly 50° C., it is added to the mixture of native starch, cellulosic fibres and the water. During the mixing, all of the raw material components are mixed homogeneously with one another in the course of a mixing time of 5 minutes. The mixing temperature is 40° C. After mixing, the mixture is not subsequently cooled.

A baking operation is then carried out in which one lump of the bakeable mass produced above is placed in a customary baking mold and baked at 150° C. for 60 seconds.

This process produced shaped bodies which are well foamed. They are, in addition, very light and have a foam-like wall structure which has a heat-insulating action. In addition, the bakeable mass can be metered very readily into the baking mold.

What is claimed is:

1. Process for producing a shaped body made of biodegradable material in which a bakeable mass is produced by mixing from 7.6 to 8.5% by weight of cellulosic fibres, from 16.1 to 17.6% by weight of native starch, from 5.4 to 6.0% by weight of pregelatinized starch and from 68.0 to 70.6% by weight of water, in each case based on the bakeable mass, and the bakeable mass is then baked, forming a shaped body.

2. Process according to claim 1, wherein the bakeable mass has a viscosity of from 70,000 to 80,000 mPa.s.

3. Process according to claim 1, wherein the pregelatinized starch is produced from 90 to 94% by weight of water and from 6 to 10% by weight of native starch.

4. Process according to claim 3, wherein the pregelatinized starch is produced by producing a homogeneous suspension having water and native starch, heating and then cooling this suspension.

5. Process according to claim 4, wherein said heating is carried out to a temperature of from 68 to 70° C.

6. Process according to claim 4, wherein said cooling is carried out to a temperature of about 50° C.

7. Process according to claim 1, wherein the bakeable mass is produced by combining in parallel or sequentially the cellulosic fibres, the native starch, the pregelatinized starch and the water and then mixing them.

8. Process according to claim 7, wherein the pregelatinized starch is added at a temperature of about 50° C. to the mixture of native starch, fibres and water.

9. Process according to claim 7, the mixing being carried out for about 5 minutes.

10. Process according to claim 1, the baking time being from 10 to 100 seconds.

11. Process according to claim 1, the baking temperature being from 100 to 200° C.

12. A shaped body made of biodegradable material, said shaped body having been made by producing a bakeable mass by mixing from 7.6 to 8.5% by weight of cellulosic fibres, from 16.1 to 17.6% by weight of native starch, from 5.4 to 6.0% by weight of pregelatinized starch and from 68.0 to 70.6% by weight of water, in each case based on the bakeable mass, and the bakeable mass is then baked, forming a shaped body.

13. A package made by the steps of producing a bakeable mass by mixing from 7.6 to 8.5% by weight of cellulosic fibers, from 16.1 to 17.6% by weight of native starch, from 5.4 to 6.0% by weight of pregelatinized starch and from 68 to 70.6% by weight of water, in each case based on the bakeable mass, and baking said bakeable mass in a mold.

* * * * *